US010035461B2

(12) United States Patent
Lin et al.

(10) Patent No.: US 10,035,461 B2
(45) Date of Patent: Jul. 31, 2018

(54) ELECTRONIC DEVICE

(71) Applicant: UNIDISPLAY INC., Hsinchu County (TW)

(72) Inventors: Sheng-Hsien Lin, Tainan (TW); Leng-Chieh Lin, Taoyuan (TW); Wei-Chieh Wang, Yunlin County (TW); Meng-Chia Chan, Taichung (TW); Ming-Yuan Hsu, Taichung (TW)

(73) Assignee: UNIDISPLAY INC., Hsinchu County (TW)

( * ) Notice: Subject to any disclaimer, the term of this patent is extended or adjusted under 35 U.S.C. 154(b) by 0 days.

(21) Appl. No.: 15/397,733

(22) Filed: Jan. 4, 2017

(65) Prior Publication Data
US 2017/0190290 A1   Jul. 6, 2017

(30) Foreign Application Priority Data

Jan. 5, 2016 (TW) .............................. 105200067 U

(51) Int. Cl.
| | |
|---|---|
| *G02F 1/153* | (2006.01) |
| *B60R 1/08* | (2006.01) |
| *G02F 1/155* | (2006.01) |
| *G02F 1/157* | (2006.01) |
| *G02F 1/161* | (2006.01) |
| *G02F 1/1335* | (2006.01) |
| *G02F 1/1339* | (2006.01) |
| *G02F 1/1345* | (2006.01) |

(52) U.S. Cl.
CPC .............. *B60R 1/088* (2013.01); *G02F 1/155* (2013.01); *G02F 1/157* (2013.01); *G02F 1/1533* (2013.01); *G02F 1/1339* (2013.01); *G02F 1/1345* (2013.01); *G02F 1/133512* (2013.01); *G02F 1/161* (2013.01); *G02F 2001/1536* (2013.01)

(58) Field of Classification Search
CPC ....................................................... B60R 1/088
USPC ........................................................... 359/274
See application file for complete search history.

(56) References Cited

U.S. PATENT DOCUMENTS

| | | |
|---|---|---|
| 2007/0153356 A1 | 7/2007 | McCabe et al. |
| 2012/0229882 A1* | 9/2012 | Fish, Jr. .................. B60R 1/025 359/267 |

OTHER PUBLICATIONS

"Search Report of Europe Counterpart Application", dated May 30, 2017, p. 1-p. 10.

* cited by examiner

*Primary Examiner* — James Jones
(74) *Attorney, Agent, or Firm* — JCIPRNET

(57) ABSTRACT

An electronic device includes a first substrate, a first electrode, a second substrate, a second electrode, an electrochromic material layer, a sealant, and a light shielding pattern layer. The first electrode is disposed on the first substrate. The second electrode is disposed on the second substrate. The electrochromic material layer is disposed between the first electrode and the second electrode. The sealant is disposed between the first substrate and the second substrate and surrounds the electrochromic material layer. The light shielding pattern layer is disposed on the first substrate. The light shielding pattern layer shields the sealant and a little portion of the electrochromic material layer near the sealant. The first electrode disposed on the first substrate and the second electrode disposed on the second substrate are not electrically connected to each other.

8 Claims, 2 Drawing Sheets

ELECTRONIC DEVICE

CROSS-REFERENCE TO RELATED APPLICATION

This application claims the priority benefit of Taiwan application serial no. 105200067, filed on Jan. 5, 2016. The entirety of the above-mentioned patent application is hereby incorporated by reference herein and made a part of this specification.

FIELD OF THE INVENTION

The invention relates to a device and more particularly to an electronic device.

DESCRIPTION OF RELATED ART

Electrochromism refers to the technology that, when an external voltage or current is applied, an electrochromic layer can exhibit a stable reversible change in optical properties (e.g. transmittance, reflectivity, or absorbance) in the visible light wavelength range, so as to show changes to color and level of transparency. The technology of electrochromism may be applied in various fields, such as energy-efficient windows, automotive rear-view mirrors, and display devices.

Generally, an electronic device having an electrochromic material layer includes a first substrate, a first electrode located on the first substrate, a second substrate opposite to the first substrate, a second electrode located on the second substrate, the electrochromic material layer located between the first electrode and the second electrode, and a sealant located between the first substrate and the second substrate and configured to surround the electrochromic material layer. The first substrate 110 is often a light transmissive substrate. Users may visually perceive the sealant with conspicuous colors through the light transmissive first substrate, which deteriorates the look of the electronic device.

SUMMARY OF THE INVENTION

The invention provides an electronic device characterized by great aesthetic design.

In an embodiment of the invention, an electronic device includes a first substrate, a first electrode, a second substrate, a second electrode, an electrochromic material layer, a sealant, and a light shielding pattern layer. The first electrode is disposed on the first substrate. The second electrode is disposed on the second substrate. The electrochromic material layer is disposed between the first electrode and the second electrode. The sealant is disposed between the first substrate and the second substrate and surrounds the electrochromic material layer. The light shielding pattern layer is disposed on the first substrate. The light shielding pattern layer shields the sealant and a little portion of the electrochromic material layer near the sealant. The first electrode disposed on the first substrate and the second electrode disposed on the second substrate are not electrically connected to each other.

According to an embodiment of the invention, the light shielding pattern layer completely shields the sealant.

According to an embodiment of the invention, the light shielding pattern layer is made of a light reflective material, a non-transparent non-light-reflective material, or a fluorescent material.

According to an embodiment of the invention, the light shielding pattern layer is located between the first substrate and the sealant.

According to an embodiment of the invention, the first electrode covers the light shielding pattern layer, and the light shielding pattern layer is located between the first substrate and the first electrode.

According to an embodiment of the invention, the light shielding pattern layer is made of a conductive material or an insulating material.

According to an embodiment of the invention, the light shielding pattern layer is located between the first electrode and the sealant.

According to an embodiment of the invention, the light shielding pattern layer is made of an insulating material. The light shielding pattern layer has a through hole, the through hole and the sealant are staggered, and the through hole and the electrochromic material layer are staggered. The electronic device further includes a conductive material and a first conductor. The conductive material fills the through hole of the light shielding pattern layer, and the first conductor is disposed between the light shielding pattern layer and the second substrate and located at peripheries of the sealant. The first conductor is electrically connected to the first electrode through the conductive material filling the through hole of the light shielding pattern layer.

According to an embodiment of the invention, the light shielding pattern layer is made of a conductive material. The electronic device further includes a first conductor disposed between the light shielding pattern layer and the second substrate and located at peripheries of the sealant. The first conductor s electrically connected to the first electrode through the light shielding pattern layer.

According to an embodiment of the invention, the electronic device further includes an insulator. The insulator is disposed between the first conductor and the second electrode to electrically insulate the first conductor from the second electrode.

According to an embodiment of the invention, the electronic device further includes a second conductor disposed between the light shielding pattern layer and the second substrate and located at peripheries of the sealant. The second conductor opposite to the first conductor is electrically connected to the second electrode.

According to an embodiment of the invention, the first electrode is a transparent electrode, and the second electrode is a reflective electrode.

In view of the above, the light shielding pattern layer of the electronic device shields the sealant and a little portion of the electrochromic material layer near the sealant. The first electrode disposed on the first substrate and the second electrode disposed on the second substrate are not electrically connected to each other. The light shielding pattern layer shields the sealant. Hence, when users operate the electronic device, it is not easy for the users to visually perceive the sealant, and thus the electronic device can have an improved look.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings

DESCRIPTION OF EMBODIMENTS

Figure 1:
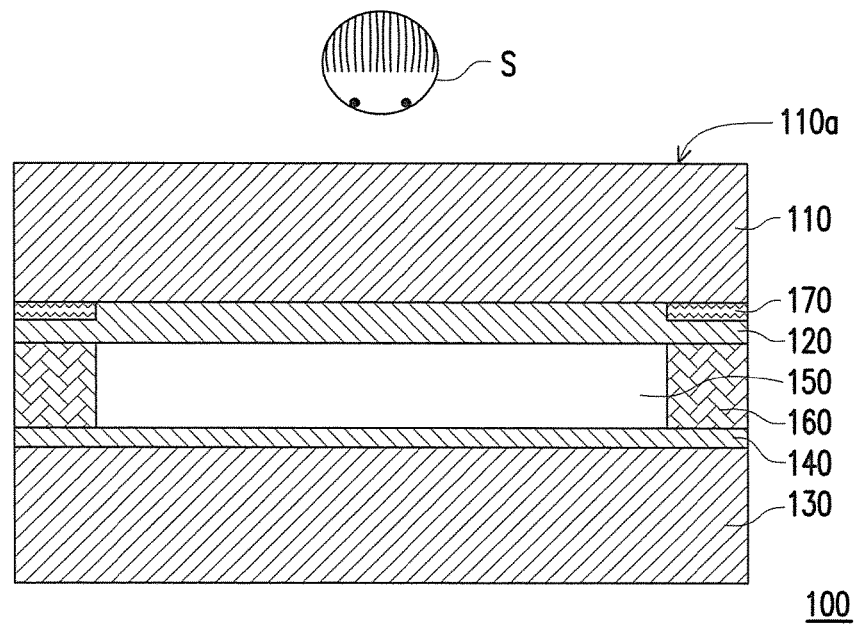
FIG. 1 is a schematic cross-sectional view of an electronic device according to an embodiment of the invention.

FIG. 1 is a schematic cross-sectional view of an electronic device according to an embodiment of the invention. With reference to FIG. 1, the electronic device 100 includes a first substrate 110, a first electrode 120, a second substrate 130, a second electrode 140, an electrochromic material layer 150, a sealant 160, and a light shielding pattern layer 170. In this embodiment, an outer surface 110a of the first substrate 110 is a visible surface of the electronic device 100 facing a user S. That is, when a user S uses the electronic device 100, the first substrate 110 is, in comparison with the second substrate 130, closer to the user S. The first substrate 110 is a light transmissive substrate. In the present embodiment, the first substrate 110 is made of glass, for example. However, the invention is not limited thereto. In other embodiments of the invention, the first substrate 110 may be made of quartz, plastic, or other suitable materials.

The first electrode 120 is disposed on the first substrate 110. In this embodiment, the first electrode 120 may be a light transmissive substrate. The first electrode 120 may be made of metal oxide (e.g., indium tin oxide, indium zinc oxide, aluminum tin oxide, aluminum zinc oxide, indium germanium zinc oxide, other suitable oxides, or a stacked layer including at least two of the above). However, the invention is not limited thereto. In other embodiments, the first electrode 120 may also be made of other suitable materials.

The light shielding pattern layer 170 is disposed on the first substrate 110. Specifically, in the present embodiment, the light shielding pattern layer 170 is located between the first substrate 110 and the sealant 160. The first electrode 120 may selectively cover the light shielding pattern layer 170, and the light shielding pattern layer 170 may be located between the first substrate 110 and the first electrode 120. However, the invention is not limited thereto; in other embodiments, the light shielding pattern layer may also be disposed at other proper locations, which will be exemplified in following paragraphs with reference to FIG. 2 and FIG. 3, for instance. According to the embodiment shown in FIG. 1, the light shielding pattern layer 170 may be made of a conductive material or an insulating material. Particularly, the light shielding pattern layer 170 may be made of a light reflective material (e.g., metal or the like), a non-transparent non-light-reflective material (e.g., black resin or the like), or a fluorescent material.

The second substrate 130 is opposite to the first substrate 110. In this embodiment, the second substrate 130 may be a light transmissive substrate. The second substrate 130 may be made of glass, quartz, plastic, and so on. However, the invention is not limited thereto. In other embodiments, the second substrate 130 may also be a non-light-transmissive/light reflective substrate and may be made of other suitable materials.

The second electrode 140 is disposed on the second substrate 130. In this embodiment, the second electrode 140 may be a light reflective substrate. The second electrode 140 is made of metal, for instance. However, the invention is not limited thereto. In other embodiments, the second electrode 140 may also be a light-transmissive electrode and may be made of other suitable materials.

The electrochromic material layer 150 is disposed between the first electrode 120 and the second electrode 140. The electrochromic material layer 150 may be an inorganic material, an organic material, or a combination thereof. In the present embodiment, the inorganic material may be metal oxide or covalent bond metal complex. The metal oxide is, for instance, a transition metal oxide (e.g., $WO_3$, $MoO_3$, $V_2O_5$, $Nb_2O_5$, $NiO$, $SnO$, $Fe_2O_3$, $CoO$, $Ir_2O_3$, $Rh_2O_3$, or $MnO_2$), and covalent bond metal complex is Prussian Blue, for instance; however, the invention is not limited thereto. The organic material is, for instance, a polymer polymerized by aniline monomer, EDOT monomer, or Viologen monomer, which should not be construed as a limitation to the invention.

The first electrode 120 and the second electrode 140 are configured to drive the electrochromic material layer 150. Specifically, if the electrochromic material layer 150 is enabled (for example, when a sufficient potential difference exists between the first electrode 120 and the second electrode 140), an electrochemical oxidation-reduction reaction is generated in the electrochromic material layer 150 to change an energy level thereof, so as to present a dimming state. When an external light sequentially passes through the first substrate and the first electrode 120 and reaches the electrochromic material layer 150, the external light is absorbed by the electrochromic material layer 150, such that the electronic device 100 (e.g., a rear-view mirror for vehicles) is switched to an anti-glare mode. On the other hand, if the electrochromic material layer 150 is disabled (for example, when there is insufficient potential difference between the first electrode 120 and the second electrode 140), the electrochromic material layer 150 is in a light transmissible state. At this time, the external light can sequentially pass through the first substrate 110, the first electrode 120, and the electrochromic material layer 150 and can be reflected by the second electrode 140, such that the electronic device 100 (e.g., a rear-view minor for vehicles) is switched to a minor mode.

The sealant 160 is located between the first substrate 110 and the second substrate 130 and surrounds the electrochromic material layer 150. That is, the first substrate 110, the second substrate 130, and the sealant 160 together seal the electrochromic material layer 150. According to the present embodiment, the sealant 160 may be located between the first electrode 120 and the second electrode 140, which should however not be construed as a limitation to the invention.

Note that the light shielding pattern layer 170 shields the sealant 160 and a little portion of the electrochromic material layer 150 near the sealant 160. The first electrode 120 disposed on the first substrate 110 and the second electrode 140 disposed on the second substrate 130 are not electrically connected to each other. To be specific, the light shielding pattern layer 170 may completely shield the sealant 160. The light shielding pattern layer 170 shields the sealant 160. Hence, when a user S uses the electronic device 100, it is not easy for the user S to visually perceive the sealant 160, and thus the electronic device 100 can have an improved look.

Figure 2:
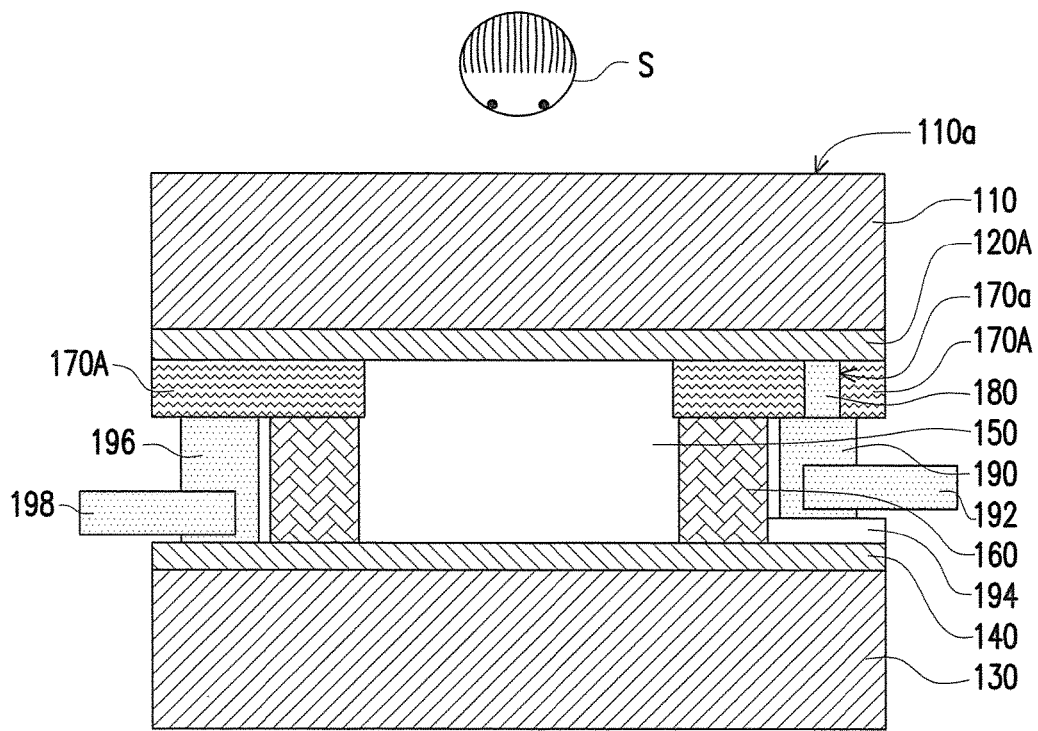
FIG. 2 is a schematic cross-sectional view of an electronic device according to another embodiment of the invention.

FIG. 2 is a schematic cross-sectional view of an electronic device according to another embodiment of the invention. Please refer to FIG. 2. The electronic device 100A depicted in FIG. 2 is similar to the electronic device 100 depicted in FIG. 1. Therefore, the same or corresponding components are represented by the same or corresponding reference numerals. The main differences between the electronic devices 100A and 100 lie in that the locations of the first electrode 120A and the light shielding pattern layer 170A in the electronic device 100A are different from those of the first electrode 120 and the light shielding pattern layer 170 in the electronic device 100. Besides, the electronic device 100A further includes a conductive material 180, a first conductor 190, a second conductor 196, and an insulator 194. The following paragraphs elaborate on the difference. For the common parts, please refer to the reference numerals in FIG. 2 and the descriptions above.

With reference to FIG. 1, the electronic device 100A includes a first substrate 110, a first electrode 120A, a second substrate 130, a second electrode 140, an electrochromic material layer 150, a sealant 160, and a light shielding pattern layer 170A. The first electrode 120 is disposed on the first substrate 110. The light shielding pattern layer 170A is disposed on the first substrate 110. The second substrate 130 is opposite to the first substrate 110. The second electrode 140 is disposed on the second substrate 130. The electrochromic material layer 150 is disposed between the first electrode 120A and the second electrode 140. The sealant 160 is located between the first substrate 110 and the second substrate 130 and surrounds the electrochromic material layer 150. The light shielding pattern layer 170 shields the sealant 160 and a little portion of the electrochromic material layer 150 near the sealant 160. The first electrode 120 disposed on the first substrate 110 and the second electrode 140 disposed on the second substrate 130 are not electrically connected to each other.

Different from the electronic device 100 depicted in FIG. 1, the electronic device 100A depicted in FIG. 2 has the light shielding pattern layer 170A between the first electrode 120A and the sealant 160. The light shielding pattern layer 170A is made of an insulating material. The light shielding pattern layer 170A has a through hole 170a, the through hole 170a and the sealant 160 are staggered, and the through hole 170a and the electrochromic material layer 150 are staggered. The electronic device 100A further includes a conductive material 180 filling the through hole 170a of the light shielding pattern layer 170A. The conductive material 180 is, for instance, a conductive ink whose color is the same as the color of the light shielding pattern layer 170A; however, the invention is not limited thereto. The electronic device 100A further includes the first conductor 190. The first conductor 190 is disposed between the light shielding pattern layer 170A and the second substrate 130 and located at peripheries of the sealant 160. Specifically, the first conductor 190 is electrically connected to the first electrode 120A through the conductive material 180 filling the through hole 170a of the light shielding pattern layer 170A.

According to the embodiment depicted in FIG. 2, the electronic device 100A further includes an insulator 194. The insulator 194 is disposed between the first conductor 190 and the second electrode 140 to electrically insulate the first conductor 190 from the second electrode 140. The electronic device 100A further includes a second conductor 196 disposed between the light shielding pattern layer 170A and the second substrate 130 and located at the peripheries of the sealant 160. The second conductor 196 opposite to the first conductor 190 is electrically connected to the second electrode 140. Besides, the electronic device 100A further includes two conductive components 192 and 198 electrically connected to the first and second conductors 190 and 196, respectively. The conductive components 192 and 198 are copper foil, for instance, which should not be construed as a limitation to the invention. A driving signal for driving the electrochromic material layer 150 may be transmitted to the first electrode 120A through the conductive component 192, the first conductor 190, and the conductive material 180 and may be transmitted to the second electrode 140 through the conductive component 198 and the second conductor 196, such that the first and second electrodes 120A and 140 are able to drive the electrochromic material layer 150.

Figure 3:
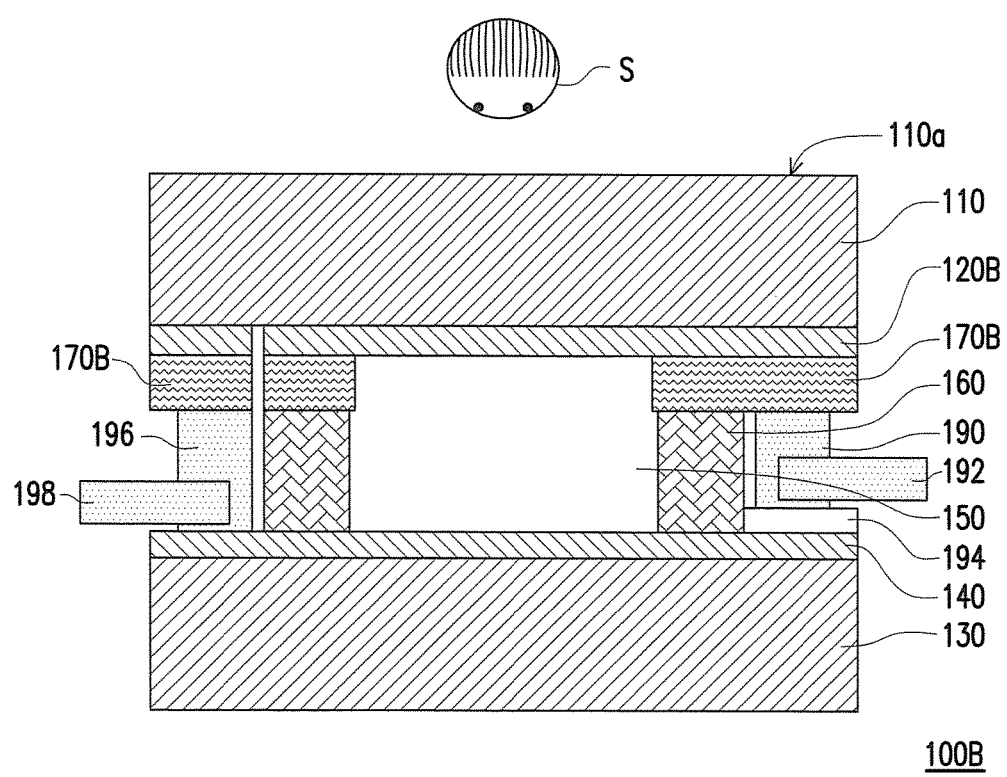
FIG. 3 is a schematic cross-sectional view of an electronic device according to yet another embodiment of the invention.

FIG. 3 is a schematic cross-sectional view of an electronic device according to yet another embodiment of the invention. Please refer to FIG. 3. The electronic device 100B depicted in FIG. 3 is similar to the electronic device 100A depicted in FIG. 2. Therefore, the same or corresponding components are represented by the same or corresponding reference numerals. The main differences between the electronic devices 100B and 100A lie in that the light shielding pattern layer 170B in the electronic device 100B is different from the light shielding pattern layer 170 in the electronic device 100. The following paragraphs elaborate on the difference. For the common parts, please refer to the reference numerals in FIG. 3 and the descriptions above.

With reference to FIG. 3, the electronic device 100B includes a first substrate 110, a first electrode 120B, a second substrate 130, a second electrode 140, an electrochromic material layer 150, a sealant 160, and a light shielding pattern layer 170B. The first electrode 120B is disposed on the first substrate 110. The light shielding pattern layer 170B is disposed on the first substrate 110. The second substrate 130 is opposite to the first substrate 110. The second electrode 140 is disposed on the second substrate 130. The electrochromic material layer 150 is disposed between the first electrode 120B and the second electrode 140. The sealant 160 is located between the first substrate 110 and the second substrate 130 and surrounds the electrochromic material layer 150. The light shielding pattern layer 170 shields the sealant 160 and a little portion of the electrochromic material layer 150 near the sealant 160. The first electrode 120B disposed on the first substrate 110 and the second electrode 140 disposed on the second substrate 130 are not electrically connected to each other. For example, the light shielding pattern layer 170B and the first electrode 120B may be patterned by laser cutting or other method so that the first electrode 120B and the second electrode 140 are not electrically connected to each other.

The light shielding pattern layer 170B is disposed between the first electrode 120B and the sealant 160. The electronic device 100B further includes the insulator 194. The insulator 194 is disposed between the first conductor 190 and the second electrode 140 to electrically insulate the first conductor 190 from the second electrode 140. Different from the electronic device 100 depicted in FIG. 1, the electronic device 100B depicted in FIG. 3 has the light shielding pattern layer 170B that is made of a conductive material. The first conductor 190 is disposed between the light shielding pattern layer 170B and the second substrate 130 and located at peripheries of the sealant 160. The first conductor 190 is electrically connected to the first electrode 120B through the light shielding pattern layer 170B. The driving signal for driving the electrochromic material layer 150 may be transmitted to the first electrode 120A through the conductive component 192, the first conductor 190, and the light shielding pattern layer 170B, so as to drive the electrochromic material layer 150.

To sum up, in an embodiment of the invention, the light shielding pattern layer of the electronic device shields the sealant and a little portion of the electrochromic material layer near the sealant. The first electrode disposed on the first substrate and the second electrode disposed on the second substrate are not electrically connected to each other. The light shielding pattern layer shields the sealant. Hence, when users operate the electronic device, it is not easy for the users to visually perceive the sealant, and thus the electronic device can have an improved look.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. An electronic device comprising:
    a first substrate;
    a first electrode disposed on the first substrate;
    a second substrate opposite to the first substrate;
    a second electrode disposed on the second substrate;
    an electrochromic material layer disposed between the first electrode and the second electrode, wherein the electrochromic material layer is enabled by the first electrode and the second electrode;
    a sealant disposed between the first substrate and the second substrate and surrounding the electrochromic material layer; and
    a light shielding pattern layer disposed on the first substrate and shielding the sealant and a portion of the electrochromic material layer, wherein the first electrode disposed on the first substrate and the second electrode disposed on the second substrate are not electrically connected to each other, wherein the light shielding pattern layer is located between the first electrode and the sealant, the light shielding pattern layer is made of an insulating material and has a through hole, the through hole and the sealant are staggered, the through hole and the electrochromic material layer are staggered;
    a conductive material filling the through hole of the light shielding pattern layer; and
    a first conductor disposed between the light shielding pattern layer and the second substrate and located at peripheries of the sealant, wherein the first conductor is electrically connected to the first electrode through the conductive material filling the through hole of the light shielding pattern layer.

2. The electronic device according to claim 1, wherein the light shielding pattern layer completely shields the sealant.

3. The electronic device according to claim 1, wherein the light shielding pattern layer is made of a light reflective material, a non-transparent non-light-reflective material, or a fluorescent material.

4. The electronic device according to claim 1, wherein the light shielding pattern layer is located between the first substrate and the sealant.

5. The electronic device according to claim 1, further comprising:
    an insulator disposed between the first conductor and the second electrode to electrically insulate the first conductor from the second electrode.

6. The electronic device according to claim 1, further comprising:
    an insulator disposed between the first conductor and the second electrode to electrically insulate the first conductor from the second electrode.

7. The electronic device according to claim 1, further comprising:
    a second conductor disposed between the light shielding pattern layer and the second substrate and located at peripheries of the sealant, wherein the second conductor is electrically connected to the second electrode.

8. The electronic device according to claim 1, wherein the first electrode is a transparent electrode, and the second electrode is a reflective electrode.

* * * * *